(12) United States Patent
Takizawa et al.

(10) Patent No.: US 6,186,672 B1
(45) Date of Patent: Feb. 13, 2001

(54) OPTICAL CONNECTOR

(75) Inventors: Kazuhiro Takizawa; Toru Arikawa; Yasuhiro Tamaki; Hiroshi Yokosuka, all of Sakura; Shinji Nagasawa; Masaaki Takaya, both of Mito, all of (JP)

(73) Assignee: Nippon Telegraph and Telephone Corporation (JP)

( * ) Notice: Under 35 U.S.C. 154(b), the term of this patent shall be extended for 0 days.

(21) Appl. No.: 09/096,068

(22) Filed: Jun. 11, 1998

(30) Foreign Application Priority Data

Jun. 16, 1997 (JP) .................................................... 9-159036
Jun. 5, 1998 (JP) .................................................. 10-158237

(51) Int. Cl.[7] ...................................................... G02B 6/36
(52) U.S. Cl. ............................... 385/85; 385/83; 385/78; 385/60
(58) Field of Search .................................. 385/83, 85, 78, 385/76, 59, 60, 71

(56) References Cited

U.S. PATENT DOCUMENTS

| 4,983,012 | * | 1/1991 | Saito et al. | 350/96.21 |
|---|---|---|---|---|
| 5,363,461 | * | 11/1994 | Bergmann | 385/78 |
| 5,367,594 | | 11/1994 | Essert et al. | |
| 5,694,506 | * | 12/1997 | Kobayashi et al. | 385/60 |

FOREIGN PATENT DOCUMENTS

| 36 08 019 A1 | | 9/1987 | (DE) . | |
|---|---|---|---|---|
| 39 02 574 A1 | | 8/1990 | (DE) . | |
| 0846965A1 | * | 8/1990 | (EP) | G02B/6/24 |
| 3902574 | * | 8/1990 | (DE) | G02B/6/40 |
| 0 429 163 A1 | | 5/1991 | (EP) . | |
| 0429163A1 | * | 5/1991 | (EP) | G02B/6/38 |
| 0 846 965 A1 | | 6/1998 | (EP) . | |

OTHER PUBLICATIONS

Patent Abstracts Of Japan, vol. 7, No. 274, JP 58152215, Sep. 9, 1983.

* cited by examiner

Primary Examiner—Darren Schuberg
Assistant Examiner—Fayez Assaf
(74) Attorney, Agent, or Firm—Pennie & Edmonds LLP

(57) ABSTRACT

Development of a multiple-core optical connector which can make multiple-core or a plurality of optical fibers connected in a simple manner has been sought. There are provided an optical connector ferrule for internally fixing beforehand the optical fibers arranged in parallel on an identical plane and having joining end surface of a tip which is polished, and an optical connector which is furnished with a connecting mechanism for maintaining a connected state by holding aforementioned optical connector which protrudes from the rear end, facing the aforementioned joining end surface of the aforementioned connector ferrule and a separate optical fiber connected by abutting against the optical fiber of the optical connector ferrule side.

9 Claims, 7 Drawing Sheets

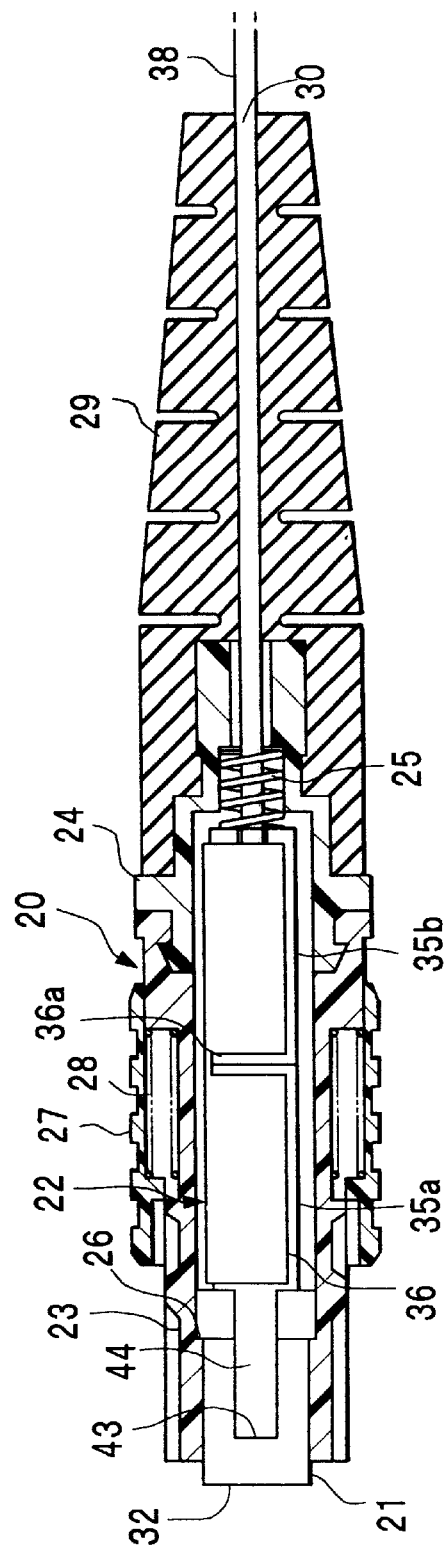
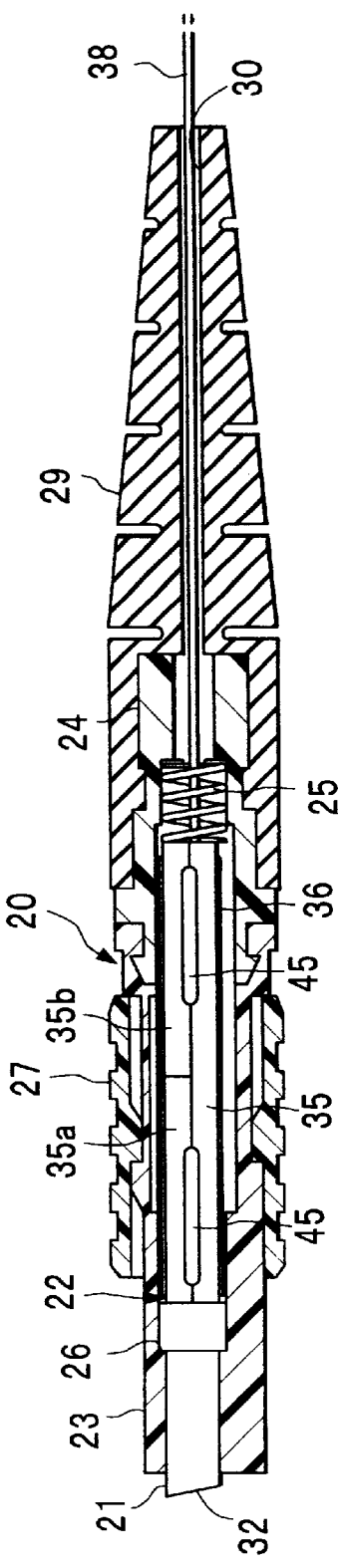

OPTICAL CONNECTOR

BACKGROUND OF THE INVENTION

1. Field of the Invention

The present invention relates to an optical connector, and more particularly to a multiple-core optical connector which is machine connectable.

2. Background of the Technology

As an optical connector which connects mutually switch-selectable tape-form optical fiber cores, the so-called "optical fiber tape core", such as optical connectors made of plastic (the so-called MT-type optical connector: Mechanically Transferable established, for example, in JIS C 5981 and the like have been provided.

In addition, with a view toward enhancing the connection workability for the optical connector made of plastic (hereinafter, to be referred to as the "plastic connector"), in the recent years, the so-called MPO connector (optical connector, established in JIS C 8981 and the like, the structure of which encases an optical connector inside of a housing) has been provided.

FIG. 6 and FIG. 7 show an MPO connector 1. In FIG. 7, this MPO connector is of such a structure that it internally supports an optical connector ferrule 2 (hereinafter, to be referred to as the "ferrule") established in JIS C 5981 and the like and a pin clamp 4 clamping a guide pin 3, which has been inserted into the neighborhood of the rear end part (the right side in FIG. 7) of the ferrule 2 of the optical connector ferrule 2, and a pin clamp 4 which clamps a guide pin 3 which penetrates the ferrule 2 in the neighborhood of the rear end part of the ferrule 2 (right side of FIG. 7) and a cylindrical coupling 6 in a cylindrical housing 5, and houses a coil spring 7 for generating butting force inside the coupling 6. The ferrule 2 is movable in the forward and backward directions (left and right directions in FIG. 7) inside the housing 5. The housing 5 is impelled toward the front (middle to left side in FIG. 7) by a spring 8, provided separately for the housing. When the ferrule 2 is pushed towards the inside of the MPO connector 1, if the housing is not driven but is located at the tip position of the MPO connector 1, then the entire body of the ferrule 2 enters the inside of the housing 5. By having an engaging projection 9 projecting from the side surface of the housing 5 detachably engage with the housing on the receiving side, of an optical connector adapter 10 and the like (refer to FIG. 6), the state of being inserted into the housing on the receiving side for the MPO connector 1 can be maintained.

In FIG. 7, reference numeral 11 is a boot and retain a terminated optical fiber 12 (the optical fiber tape core), which is capable of being abutted and connected in the ferrule 2 by the ferrule 2.

In FIG. 7, reference numeral 13 is an optical fiber hole and houses the aforementioned optical fiber 12. This optical fiber hole 13 is in the shape of a square groove, corresponding to the aforementioned optical fiber 12 which is tape-like in its shape.

In the MPO connector shown in FIG. 6 and FIG. 7, since labor is required for the use of dedicated polishing machine in the polishing of the tip of the ferrule 2, assembling the ferrule 2 at the tip of the optical fiber at the site would mean that an extremely large number of man-hours is needed.

Thus, a method whereby the connector polishing work after being connected is omitted, that is, producing the so-called "optical connector for on-site attachment" can be considered by penetrating and anchoring an optical fiber in a ferule with a pre-polished tip. In this form of optical connector, an optical fiber which has been anchored to the ferrule beforehand is pulled out behind (on the side opposite to the tip which has been polished) the ferrule and then is fusion spliced with a separate optical fiber in a subsequent process.

An example of optical connector for on-site attachment which has been already proposed is shown, as follows.

① An optical fiber connector which is disclosed in Japanese Patent Application No. Hei 6-167274 (U.S. Pat. No. 5,363,461).

For this optical connector, attachment at a work site is made easy, and it consists of a plug and a metal ring in which an optical fiber stub, manufactured beforehand, has been inserted and disposed in an inner hole and the tip of which has been polished, a main body member which houses these components, and an attaching ring. The procedure for on-site assembling consists of insertion of the optical fiber to be connected with the assembly, and once a confirmation as to the fiber is against the optical fiber stub inside the plug, the optical fiber of interest is adhesively fixed with a cement and the like.

Next, by bending the crimp arm and tightly binding the protective covering of the optical fiber arm, the procedure is completed. A refractive index adjusting material is placed in between the optical fibers.

② An optical connector which is disclosed in U.S. Pat. No. 5,040,867.

This optical connector is provided with a ferrule to which an optical fiber which has been inserted and disposed beforehand at the factory, and alignment parts for the mechanical positioning and connecting the optical fiber inside the ferrule and the external optical fiber. At the assembling site, after passing the optical fiber inside the crimp, assembly is done by inserting the fiber until it is against the optical fiber on the ferrule side.

③ An optical connector which is disclosed in U.S. Pat. No. 4,598,974.

This optical connector has a ferrule into which an optical fiber has been inserted and disposed beforehand at the factory and a connecting chamber having electrodes, which are disposed adjacent to this ferrule and facing each other inside.

In order to connect an optical fiber cable and the optical connector at the site, a bare optical fiber, the optical fiber cable of which the covered tip has been removed, is inserted into the optical connector. When abutment with the optical fibers is completed, discharge between the electrodes is conducted, and the optical fiber on the ferrule side is fusion-spliced to the optical fiber on the optical fiber cable side.

④ An optical connector which can be assembled at the site, which is disclosed in International Patent Application, No. WO 96/31795.

This optical connector is provided with a ferrule, which is built inside the optical fiber, in which a slot has been cut out for fusion of the optical fiber to be inserted. The end of the optical fiber with the built-in ferrule is exposed inside this slot, and when on-site assembling of the optical connector is made, while being observed under a microscope after the tip of the external optical fiber and the tip of the optical fiber with the built in ferule have been abutted, fusion splicing is conducted by a discharge between the electrodes. After the completion of the fusion splicing, connector housing parts are covered at the periphery of the ferrule, thereby completing the optical connector.

As was shown in aforementioned ③ and ④, when the optical fiber with the built-in ferrule and the external optical fiber are fusion spliced, there is the drawback in that because the fusion splicing is a permanent connection, it is not possible to redo a connection. That is, in reconnection work, when the connection loss of the connecting parts and the like exceed the prescribed value and switching the connection with another optical fiber by reusing the ferrule part which was fusion spliced become impossible in actual practice. The tip side of the optical fiber, including the ferrule part, must be cut off and discarded. Consequently, the drawback arises that the optical fiber becomes shorter each time the connection work is repeated.

In addition, although the optical connectors which are disclosed in ① and ② are optical connectors of mechanical splicing method, confirmation of the connected parts cannot be made from the outside.

Furthermore, each of these optical fibers are for single-core use, and heretofore there has been no suitable optical connector which is capable of being assembled on site for multiple-core connections, and the development of an optical connector for multiple-core which is capable of being assembled easily on site has been sought.

In the case of housing the fusion-spliced parts, since there is a limit as to the miniaturization of the fusion-spliced parts, there is the problem that it becomes necessary enlarge the parts size for housing a plurality of fusion-spliced parts in the MPO connector, as shown for example in FIG. 6 and FIG. 7.

SUMMARY OF THE INVENTION

It is an object of the present invention to provide an optical connector having the following features, to be achieved in the light of the aforementioned subjects:

(a) by means of a connecting mechanism furnished with an aligning mechanism, a separate optical fiber can be easily connected to the optical fiber on the side of the optical connector ferrule.

(b) by means of the connecting mechanism (a), since a plurality of pairs of optical fibers which are abutted and connected can be collectively clamp held and maintained in the connected state, the connecting parts can be miniaturized.

(c) by having substantial congruity between the arrangement plane of the optical fiber fixed to the optical connector ferrule and the arrangement plane of the aligning axis of the aligning mechanism, optical characteristics of the optical fiber on the optical connector ferrule side can be stably maintained.

(d) by and incorporating fixing and an extended part, which projects from the element into a cutout of the optical connector ferrule, the optical fiber on the optical connector ferrule side and the one side of the devices can be fixed securely and thereby the optical characteristics of the optical fiber on the optical connector ferrule side can be maintained more surely.

(e) having such a constitution as to have the extended part (d) incorporated and fixed in the cutout, a separate part for fixing can be dispensed with, thus facilitating miniaturization. Moreover, when forming V-shaped groove and U-shaped groove of the positioning groves as aligning mechanisms for the device, the positioning groove is formed extending to the extended part, thereby facilitating the formation.

The present invention, as the means of solving these problems, provides an optical connector which disposes optical fibers, arranged in parallel on an identical arranging plane and the joining end surface of the tip thereof has been polished, a connecting mechanism clamp holds and maintains the connected condition of this optical fiber which projects from end of this connector ferrule facing said joining end surface and another optical fiber abutting. A connecting to the optical fiber of this optical connector ferrule, and this connector device is provided with two-part devices, an aligning mechanism tor positioning alignment, capable of abutting both the optical fibers which have been inserted in between both devices from sides facing opposite both devices, and a round C-shaped or square C-shaped spring for clamp holding, permitting opening and closing inbetween both devices by interposing both devices from the exterior side, and has optical fiber which projects from the optical connector ferrule inserted in between the both devices beforehand and positioning aligned by the aligning mechanism.

The optical fiber which projects from the rear end of the optical connector ferrule is internally furnished beforehand in the connecting mechanism and is positioning aligned by the aligning mechanism, and then is abutted and connected with another optical fiber which has been inserted into a separate connecting mechanism from the opposite side. Both optical fibers which connect are accurately positioning aligned, and abutted and connected. After being connected, they are clamp held in between the devices by the clamp force of a spring, and maintained in a connected state. For the optical fiber connected to the optical fiber on the side of the ferrule in the connecting mechanism, besides a multiple-core optical fiber such as the optical tape core and the like, various types of constructions such as a plurality of segments of single-core optical fibers and the like are adoptable, and the construction of the connecting mechanism varies according to the mode of this optical fiber.

BRIEF DESCRIPTION OF THE DRAWINGS

The above-mentioned and other object, features and advantages of this invention will become more apparent by reference to the following detailed description of the invention taken in conjunction with the accompanying drawings, in which FIG. 1(*a*) is a plane sectional drawing of an optical connector, and FIG. 1(*b*) is a normal sectional drawing of the optical connector showing an embodiment of the optical connector of the present invention.

DETAILED DESCRIPTION OF THE EMBODIMENTS OF THE INVENTION

Figure 2:
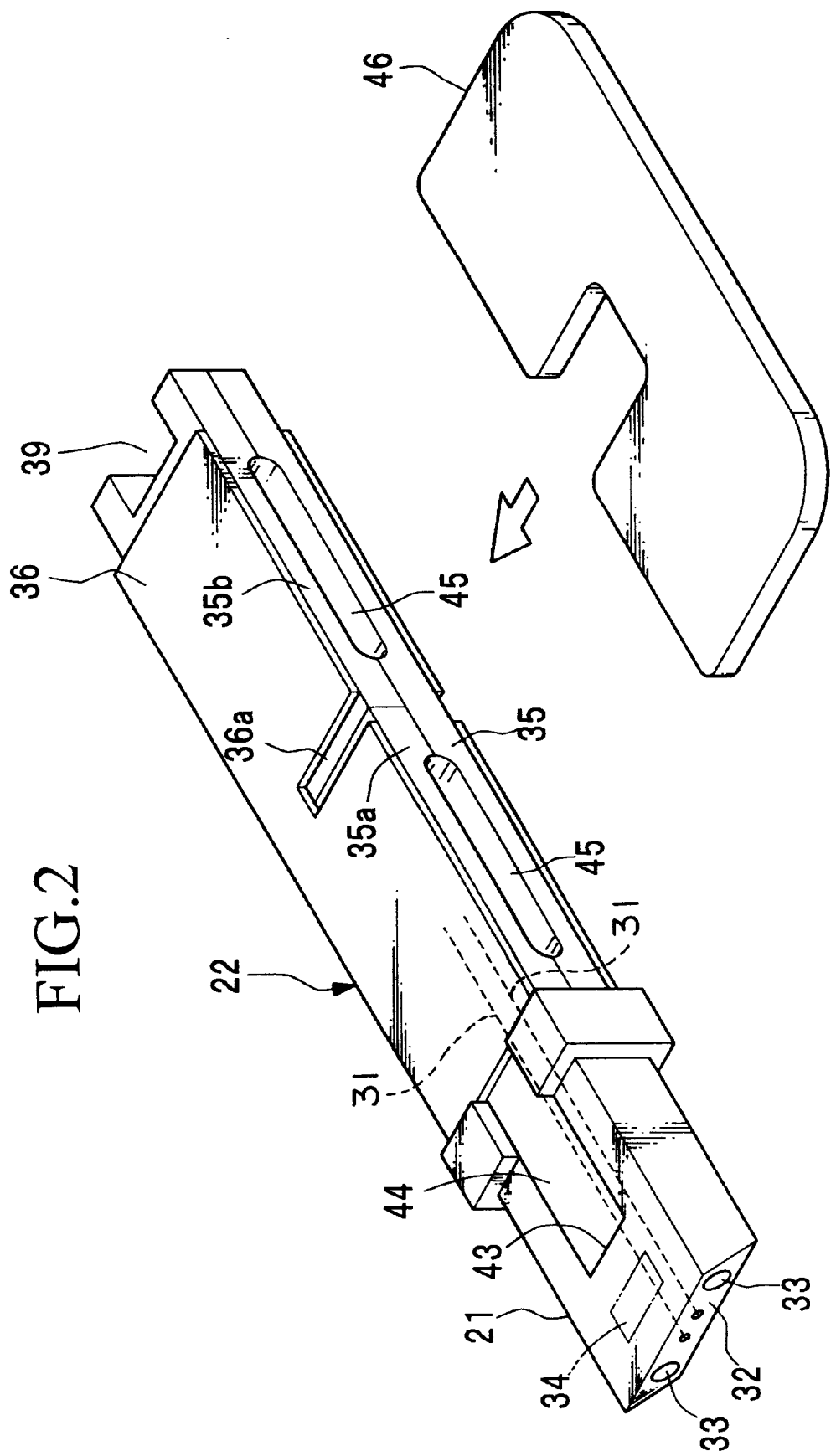
FIG. 2 is an perspectival view showing an overall outline of the optical connector ferrule and the connecting mechanism of the optical connector of FIG. 1.

The optical connector of the present invention will be described with reference to FIG. 1 to FIG. 4, as follows.

In FIGS. 1(a),(b), this optical connector 20 internally supports an optical connector ferrule 21 (hereinafter, to be referred to as "ferrule" and a connecting mechanism 22, inside a square-tube shaped housing 23. The ferrule 21 and the connecting mechanism 22 are linked and move integrally in the directions (left and right directions in FIGS. 1(a) and (b)) inside the housing 23. A square-tube shaped rear housing 24 is anchored on the rear of the housing 23 (the right side in FIGS. 1(a) and (b)), and the ferrule 21 and the connecting mechanism 22 are housed inside the rear housing 24 toward the front (the left side in FIGS. 1(a) and (b)) by a coil spring 25, which produces a repulsive force. The ferrule 21 is regulated with respect to the forward movement, by bringing it into contact a step 26 as a movement regulating means which has been formed on the housing tip 23. Movement regulating means is not restricted to the step 26, and various constructions such as an abutting wall, projection, and various other constructions can be adopted. Furthermore, it can be pushed in the direction of the rear housing 24, within the elastic deformation range of the coil spring 25.

This coil spring 25 functions as an impelling means which is mentioned in claim 5. The impelling means for impelling the optical connector ferrule 21 and the connecting mechanism 22 forward is not restricted to a coil spring, and adoption of elastic bodies, including plate spring and rubber, is possible. For a ring-shaped impelling means made of rubber and the like, and coil spring 25, it is preferable that the construction of an optical fiber 38 which is inserted separately into the connecting mechanism 22 be inserted into the interior. As a result of this, the need to give unnecessary bending to the optical fiber 38 no longer exists, and moreover, since it is unnecessary to provide an insertion space for the optical fiber 38 separately from the installation space of the impelling means, the design of the housing 23 is also simplified.

Figure 6:
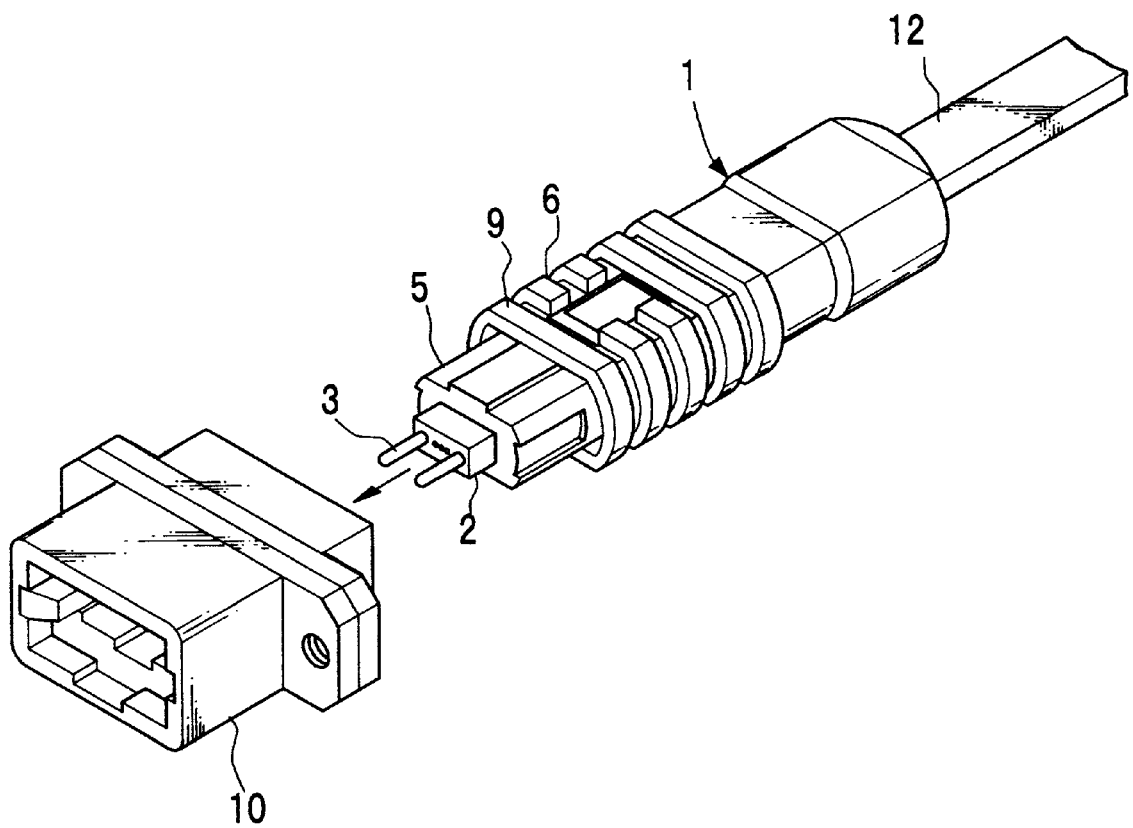
FIG. 6 is an exploded perspective view showing the background technology related to the optical connector present patent application.
Figure 7:
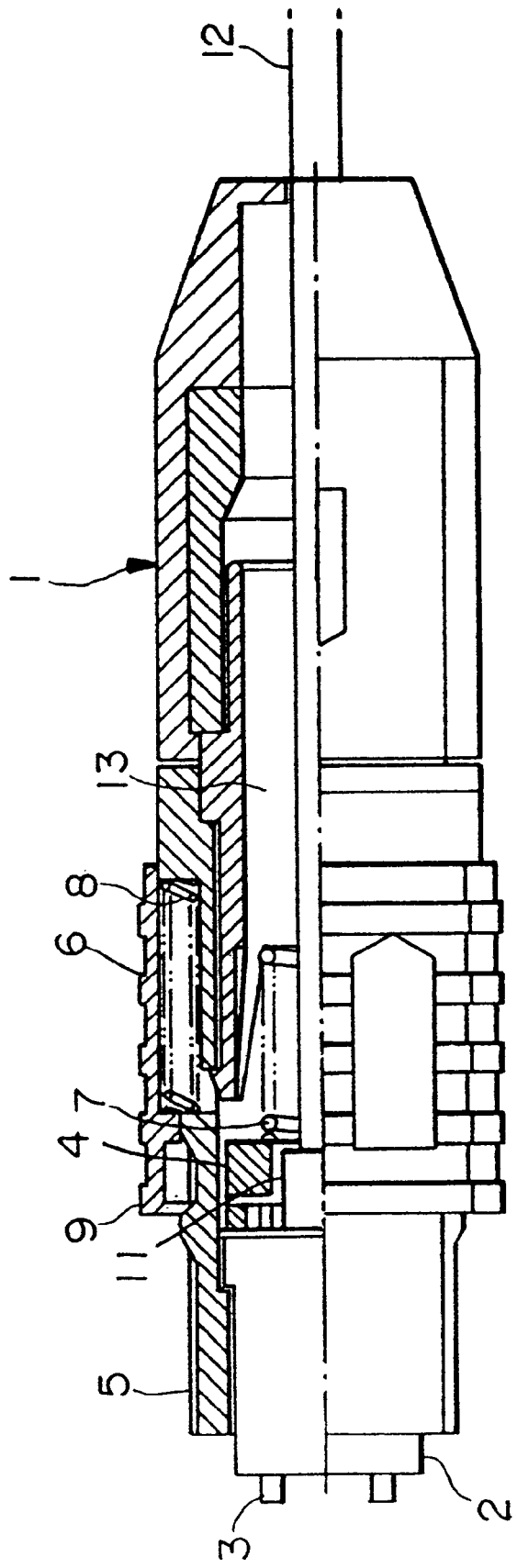
FIG. 7 is a normal plane view showing the background technology of the optical connector of the present patent application.

A coupling 27 is installed to move freely on the outside of the housing 23. When the optical connector 20 is inserted into the housing on the receiving side, such as the optical connector adapter 10 (refer to FIG. 6), the coupling 27 is engaged detachably in the housing on the receiving side. Further, at this time, although the housing 23 is impelled towards the rear by a spring 28, which is provided between the coupling 27 and the housing 23, since the ferrule 21 has been impelled forward by the impelling force of the coil spring 25, when the ferrule 21 abuts against the ferrule which has been held inside the housing on the receiving side, the impelling force of the spring 25 imparts an abutting force between the both ferrules.

In FIGS. 1(a) and (b), reference numerals 29 and 30 are a boot and an optical fiber hole, respectively.

FIG. 2 shows the ferrule 21 and the connecting mechanism 22.

In FIG. 2, the ferrule 21 is of a construction similar to the optical connector established in JIS C 5981, and the entire ferrule is made of resins such as plastics and the like, having a plurality of pieces (two pieces in FIG. 3) of optical fibers 31 (bare fiber), internally anchored and arranged in parallel. The tip of the optical fiber 31 is exposed to a joining end surface 32 of the ferrule 21, and the optical fiber 31 is inserted into the inside of the connecting mechanism 22, projecting from the rear end (at further upper right in FIG. 2) of the ferrule 21. In the figure, reference numeral 33 is guide pin holes, and a guide pin (not shown) is engaged which performs positioning between the ferrules which abut and connect. Inside the ferrule 21, the positioning for the optical fiber 31 is made accurately, along the entire longitudinal direction, and the optical fiber is fixed by adhesives such as an epoxy resin, so as to be in parallel with the guide pin holes 33. The joining end surface 32 is PC polished at an inclination of about 8°, with respect to the optical axis of the optical fiber 31. Since the inclined joining end surface 32 is also required for a separate ferrule which abuts and connects with the ferrule 21, and moreover, since the both ferrules become connectable only when the direction of inclination of the joining end surface is exactly opposite in relation, when the ferrules are connected to each other, the targeted optical fibers themselves are made to be accurately connected. Thus there is no chance that the optical fibers will be connected in the reverse order. The polishing process of the joining end surface 32 is completed in the factory, and at the site where this optical connector 20 of this optical fiber terminal which is the object will be assembled, an optical connector 20 for which the polishing of the joining end surface 32 has been completed, will be supplied.

Further, when a multiple-core optical fiber is internally fixed in the ferrule 21, it is preferable that the optical fibers themselves be in parallel, such as in the optical fiber tape core and the like.

In FIG. 2, reference numeral 34 is injecting hole and is used for filling the inside the ferrule 21 with adhesive, after the optical fiber 31 has been inserted inside the ferrule 21.

The connecting mechanism 22 is arranged at the rear end side of the ferrule 21. This connecting mechanism 22 is of square rod shape as a whole and is provided with the longitudinal side in the longitudinal direction of the optical fiber 31. This connecting mechanism 22 clamp holds devices 35, 35a and 35b of the halved structures, by a spring 36 (a U-shaped spring of cantilever type) which is attached from the outside, so as to maintain the integrated state. The devices 35, 35a and 35b are formed of a transparent resin, and the light radiated from the tip of optical fiber 31 which has been inserted in between these devices 35, 35a and 35b via a U-shaped opening of the spring 36 and the like is made to be visually observable from the outside, via an optical instrument such as a magnifying mirror and the like.

Figure 3:
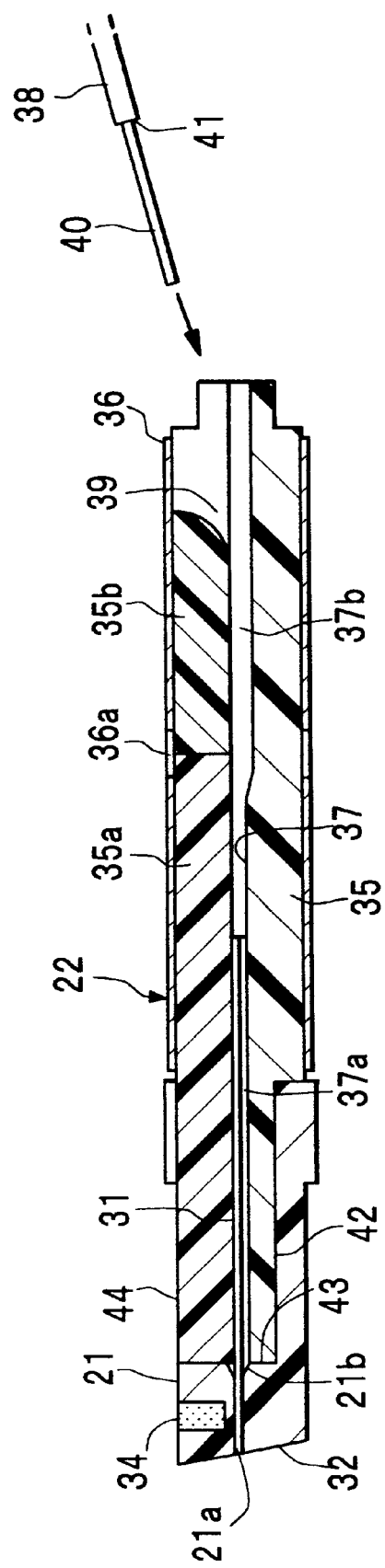
FIG. 3 is a normal plane view showing the optical connector ferrule and the connecting mechanism of FIG. 2.

FIG. 3 is a sectional view showing the ferrule 21 and the connecting mechanism 22.

AS shown in FIG. 3, the connecting mechanism 22 is openable between the oblong device 35 and the devices 35a and 35b, which are arranged in series along the device 35. Preferably the devices 35a and 35b have square parts which approach the spring 36, tapering smoothly, so that the opening and closing operations become smooth. A construction, such that the devices 35a and 35b open and close with the hinges at the center can also be adopted. However, the positions of the hinges are to be on the opposite side, counterposing openings 45, into which a wedge-shaped releasing member 46 is to be inserted.

Figure 4A:
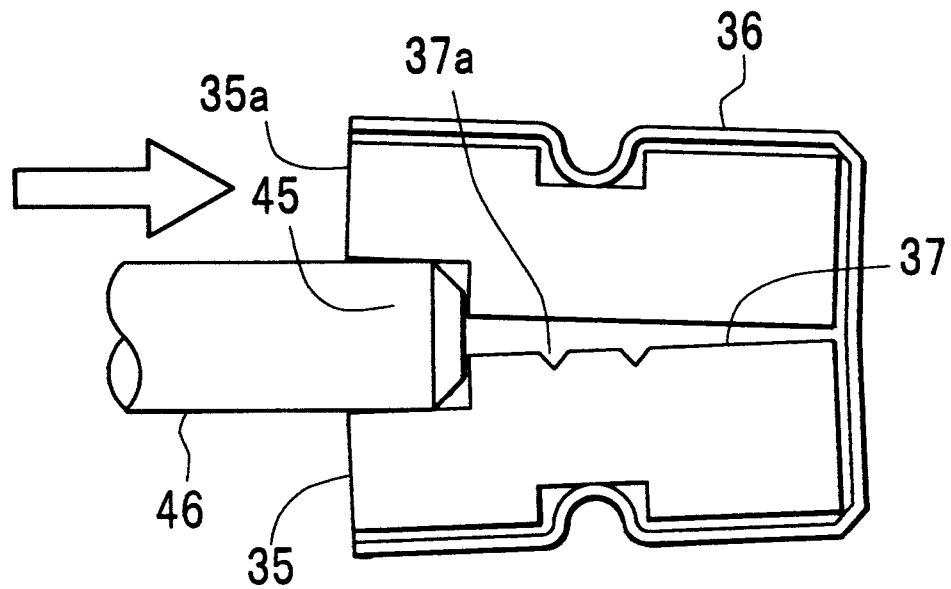
FIG. 4(*a*) is a sectional drawing showing the connecting mechanism when released, and FIG. 4(*b*) shows the optical fiber of the connecting mechanism when clamped.

On a splitting surface 37 of the device 35, corresponding to the device 35a which has been arranged close to the ferrule 21, a plurality of pieces of aligning mechanisms 37a, made of V-shaped and U-shaped positioning grooves and the like is formed along the longitudinal direction of the device 35 (two pieces in the present embodiment; Refer to FIGS. 4(a) and (b).), corresponding to the number of pieces of the optical fiber 31. The optical fiber 31, projecting from the ferrule 21 is housed in this aligning mechanism 37a and is positioned and aligned accurately. The optical fiber 31 housed in the aligning mechanism 37a, is clamp held between the device 35 and 35a by the clamp force of the spring 36. On the other hand, in the region corresponding to the device 35b of the device 35, a tape housing groove 37b is formed, which houses a tip to be covered 41 of the optical fiber 38 (two-core optical fiber tape core in the present embodiment), inserted separately from an indented part 39 of the rear end (right side in FIG. 3) of the connecting mechanism 22.

In FIG. 3, the optical fiber 31 on the ferrule side 21 is housed inside an optical fiber housing hole 21a, which is formed inside the ferrule 21. Since a tapered hole 21b is formed on the rear end (right side in FIG. 3) of the optical fiber housing hole 21a, the work involved in housing the optical fiber 31 into the optical fiber housing hole 21a is easy.

Further, the square-rod shaped connecting mechanism 22, as shown in FIG. 1, is appropriate for the square-tubular housing 23 and for the shape of the rear part housing 24, and since it can be housed efficiently, the optical connector 20 can be miniaturized. Further, for the connecting mechanism 22 which is housed in the square-tubular housing 23 and the rear part housing 24, the rotation about the axis is regulated by these housings 23 and 24 and the mechanism is housed stably at the prescribed position.

As shown in FIG. 3, the optical fiber 38 is removed of its cover and has a single-core optical fiber 40 with an exposed tip inserted into the aligning mechanism 37a from the indented part 39, via a tape part housing groove 37b and is abutted and connected with the optical fiber 31 on the ferrule side 21 inside the aligning mechanism 37a. At the same time as the abutting and connecting of the single-core fiber 40 and the optical fiber 31, the tip to be covered 41 is housed in the tape part housing groove 37b. In this connecting mechanism 22, the optical fibers 31 and 40, which have been housed in the aligning mechanism 37a, are maintained in the connecting state, clamp held between the devices 35a and 35, and the tip to be covered 41 is clamp held, and housed in the tape part housing groove 37b, sandwiched between the devices 35b and 35, thereby imparting resistance against being pulled out.

As an aligning mechanism which utilizes positioning groove, for example as described in PCT/JP/02357 which has been previously filed by the present applicant, various types of groove shapes are adoptable. In other words, in addition to the positioning groove being a V-shaped groove and U-shaped groove and the like being adoptable, other various types of groove shapes are possible, and the disposition position relation of a tape housing groove which precisely aligns an aligning part and which enables bare fiber to be abutted and connected with a tape housing groove which houses tape part and the like, can be changed with respect to various designs. Also, in response to the case in which the optical tape core is of a structure provided with a tape part, a single-core part of and a bare fiber, the shape of the positioning groove in which the cross sectional shape is changed in multiple steps in the middle of the longitudinal direction, so as to enable housing of each part of the optical filer tape core very efficiently, can be also adopted.

Figure 5:
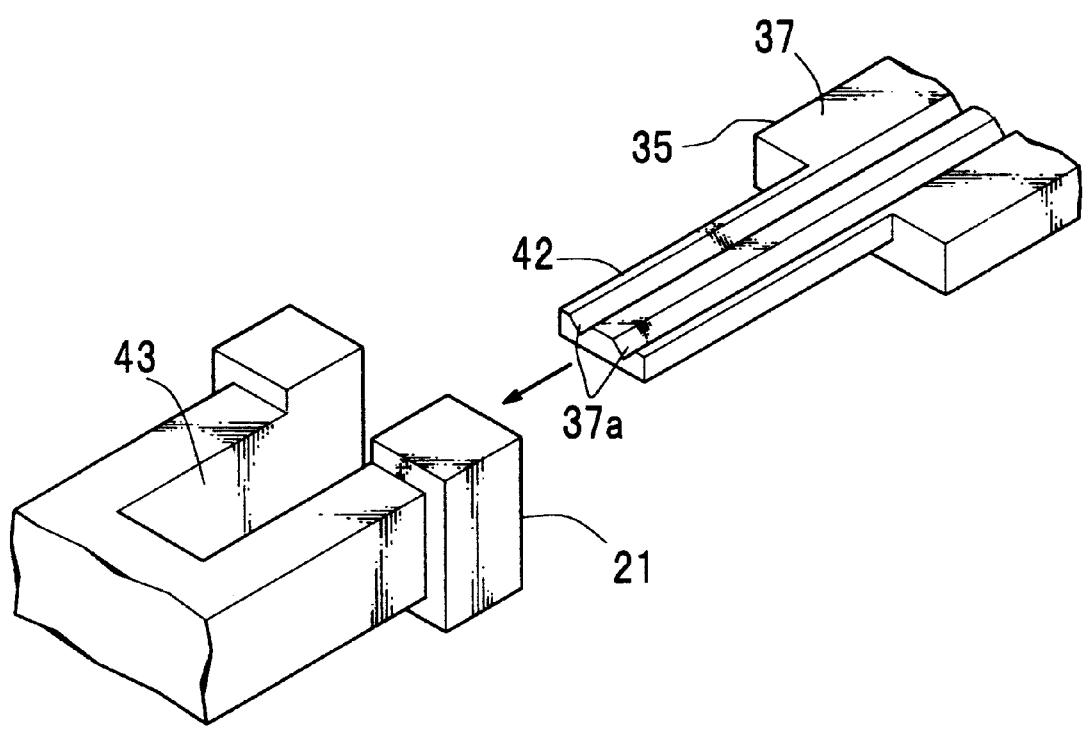
FIG. 5 is an perspectival view showing a projection part, extending from the device of FIG. 2 which constitutes the connecting mechanism.

As shown in FIG. 5, an extended part 42 projecting from the one side of the device 35 toward in the direction of the ferrule 21 is abutted and arranged and is inserted into a cutout 43, formed on the rear part of the ferrule 21 and is fixed by an adhesive and the like. The aligning mechanism 37a penetrates through to the tip of the projecting direction of the extended part 42, and as shown in FIG. 3, when the extended part 42 is anchored to the cutout 43, it collinearly connects the optical fiber housing hole 21a of the ferrule 21 to the aligning mechanism 37a. Although an extended part 44 is also abutted and arranged from the device 35a in the direction of the ferrule 21, since this extended part 44 is not fixed on the ferrule 21, it is openable with respect to the device 35.

For the device 35 which is a separate body with respect to the ferrule 21, formation of the aligning mechanism 37a which is a precisely formed positioning groove is easy, in comparison to the integrated structure of the ferrule 21. Further, even though the device 35, having an extended part 42 inserted into the cutout 43 and fixed, is a separate body with respect to the ferrule 21, in comparison to one which does not have an extended part 42, it has such advantages as precision in positioning with respect to the ferrule 21 (the precision of alignment between the optical fiber hole opened on the joining end surface 32 ferrule 21 and the aligning mechanism 37a) and sufficient anchoring strength at the time of adhering can be obtained.

Further, a device of structure integrated with the ferrule means that one side of the device of a halved structure is continuous with the ferrule. In contrast to this, the other side of the device is of such a structure that it opens and closes.

The structure, having the aligning mechanism 37a which is a positioning groove, penetrates into the tip of the projecting direction of the extended part 42, facilitates the formation of the aligning mechanism 37a in the device 35 made of resin and is advantageous in securing accuracy of its formation. That is, although the device 35 is precisely formed using a molding, in order to make the devices 35 small in size, and further form a plurality of minute positioning grooves, a relatively high level of technique is required, taking into consideration the shrinkage and the like at the time of cold curing. However, when the device 35 on which the extended part 42 has been arranged is formed as an extension, the size of the device 35 to be formed becomes relatively large, and the formation region of the positioning groove also becomes wide, thereby facilitating the control of the molding resin spreading through the molding and making molding relatively easy.

Now, with respect to the optical connector 20, although there is demand for miniaturizing it or for housing it in a known MPO housing, there is a limit due to the problem of securing precision in alignment, related to making the length of the aligning mechanism 37a, which is a positioning groove, shorter than the stipulated length. For example, when the aligning mechanism 37a is shortened, in order to shorten the length of the connecting mechanism 22, which is to be inserted at this location and positioned, and when making the optical fiber 31 on the ferrule side 21 excessively short, securing the alignment precision of the optical fiber 31 becomes difficult. The concern arises due to the problem of positional deviation easily arising during the opening and closing of the connecting mechanism 22 and abutting and connecting, with respect to the optical fiber 40 and the like. However, if the structure is one which extends the aligning mechanism even to the extended part 42, which is to be inserted into and fixed on the cutout 43, then even though the projecting length from the ferrule 21 of the connecting mechanism 37a is shortened, the length of the aligning mechanism 37a, which is the positioning groove, can be sufficiently secured. Thus, the alignment accuracy of the optical fiber 31 can be secured stably. As a result, the length of the connecting mechanism 22 can be shortened, thereby enabling miniaturization of the optical connector 20 as a whole.

In this way, if sufficient length has been secured for positioning alignment in the aligning mechanism 37a, at the time of assembling of the connecting mechanism 22, easy visual confirmation on the state of the positioning of the optical fiber 31 to be positioned beforehand is made possible in this aligning mechanism 37a, thereby enhancing the overall assembling workability of the optical connector 20.

For the device of the integrated structure on the aforementioned ferrule, the aligning mechanism can be extended further inside of the ferrule (the side of the joining end surface). Since the length of the aligning mechanism inside the ferrule can be still extended further, as compared to the case of forming an extended part, further miniaturization of the optical connector is made possible.

If the structure of the optical connector is such as to allow extending the aligning mechanism further inside of the ferrule, regardless of whether it is a single body or a separate body of the device, with respect to the ferrule, it is possible, in either structure, for example, to set the connecting point of the optical fiber on the ferrule side and the optical fiber which has been separately inserted into the connecting mechanism to be inside the ferrule. As a result of this, extensive miniaturization of the optical connector is made possible.

The optical fiber 31 on the side of the ferrule 21, has a sufficient length for securing sufficient precision in positioning, when the aligning mechanism 37a is inserted. Moreover, when the optical fiber 40 which has been inserted separately into the connecting mechanism 22 is abutted and connected, the length of the optical fiber is set to a range which is not excessively long, so that there is hardly any occurrence of deformation. Further, in this range, there is the advantage that the optical fiber 31, which has been set as short as possible, is capable of lowering the probability of unexpected breaking due to an impact force and the like which acts on the optical connector 20.

As shown in FIGS. 2(a) and (b), there are the openings 45 which are opened on the side of the connecting mechanism 22 into which the wedge-shaped releasing member 46 is to be inserted. With this connecting mechanism 22, when the releasing member 46 is press fitted into the opening 45 resisting the clamp force of the spring 36, the spaces between the devices 35, 35a and 35b are caused to be pushed out. The spaces between the devices 35, 35a and 35b are openable within the range of elastic deformation of the spring 36, and at the time of opening of the devices 35, 35a and 35b, the optical fiber 38 is freely detachable with respect to the connecting mechanism 22.

Furthermore, the connecting mechanism 22 can be changed with respect to various designs. For example, it is also possible to have the device 35 and the ferrule 21 to be formed integrally and the like. In this case, the number of parts is reduced, thereby allowing greater in cost reduction and manufacturing efficiency.

The aligning mechanism 37a extends to the extended part 42 of the device 35, and the optical fiber 31 on the ferrule side, which is housed in the aligning mechanism 37a, is interposed between the extended parts 42 and 44 of the both devices 35 and 35a. Since the extended parts 42 and 44 are of forms which match each other and are housed in the cutout 43 substantially without play, the optical fiber 31 on the ferrule side is not exposed from the ferrule 21 and the connecting mechanism 22 at all, and is protectively housed, so that there is no concern for its being damaged.

Further, since the openings 45 are respectively open at the positions corresponding to the devices 35a and 35b, each of the devices 35a and 35b can be opened and closed separately.

Since a slit 36a is formed in the spring 36 and respective parts corresponding to the devices 35a and 35b are made to function as respective separate springs, the optical fibers 31 and 40, which have been housed in the aligning mechanism 37a, and a tip to be covered 41, which is housed in a tape part housing groove 37b, can be clamp held respectively by an appropriate clamp force. Moreover, the dimensions of these optical fibers 31, 40 and the tip to be covered 41 can be also changed to correspond the position of slit 36a.

As shown in FIG. 2, the optical fiber 31 is arranged in parallel on an identical arrangement plane at the ferrule 21. As shown in FIGS. 4(a) and (b), the aligning mechanism 37a is arranged in parallel on an identical arrangement plane on the connecting mechanism 22 and substantially matches with the arranging plane of the optical fiber 31 and the arranging plane of the aligning mechanism 37a, inside the ferrule 21. For this reason, the optical fiber 31 is substantially on the identical plane, extending from the ferrule 21 to the connecting mechanism 22. Since the extended part 42 of the device 35 is fixed on ferrule 21, the occurrence of positional deviation in the optical fiber 31 between the ferrule 21 and the aligning mechanism 22 is prevented, whereby inconveniences such as bending of the optical fiber 31 are prevented, and optical characteristics are stably maintained.

In FIG. 2, since the arrangement pitch of the optical fiber 31 of the ferrule 21 and the arrangement pitch of the aligning mechanism 37a (not shown in FIG. 2) match each other, the optical fiber 31 on the side of the ferrule 21 becomes straight, extending from the ferrule 21 over to the aligning mechanism 22, thereby accurately maintaining the optical characteristics of the optical fiber 31. Furthermore, when more than two aligning mechanisms 37a have been attached to the connecting mechanism 22, it is also possible to make the arrangement pitch of the aligning mechanism 37a to be slightly larger than the arrangement pitch of the optical fiber 31 on the ferrule 21. However, even the aligning mechanism has multiple shapes, the arrangement pitch of the aligning mechanism preferably matches the arrangement pitch of the optical fiber inside the ferrule.

As shown in FIGS. 1(a) and (b), with this optical connector 20, the optical fiber 38 penetrates a boot 29 and the optical fiber hole 30, and further penetrates the inside of the coil spring 25, and is inserted into the inside of the connecting mechanism 22 from the indented part 39 (not shown in FIG. 1. Refer to FIG. 3.). Thus, there is no chance of the optical fiber 38 interfering with the coil spring 25. Also when the ferrule 21 and the connecting mechanism 22 is pushed in the direction of the rear part of the housing 24, the bent optical fiber 38 is housed inside the optical fiber hole 30, by the approach of the aligning mechanism 22 toward the boot 29.

This optical connector 20 can be easily assembled on the tip of the target optical fiber 38.

In other words, in assembling this optical connector 20, first, the optical fiber 38 is made to penetrate the boot 29, the optical fiber hole 30 and the coil spring 25. Then it is connected to the optical fiber 31 on the side of the ferrule 21, by inserting the exposed tip of the single-core optical fiber 40 into the connecting mechanism 22. Then, after the completion of the connection work, it is sufficient to house the ferrule 21 and the connecting mechanism 22 in the housing 23.

FIG. 4 is a sectional view showing the opening and closing of the connecting mechanism 22, and (a) and (b) show the releasing time of the devices 35 and 35a, and the clamping time of the optical fiber 31, respectively.

Figure 4B:
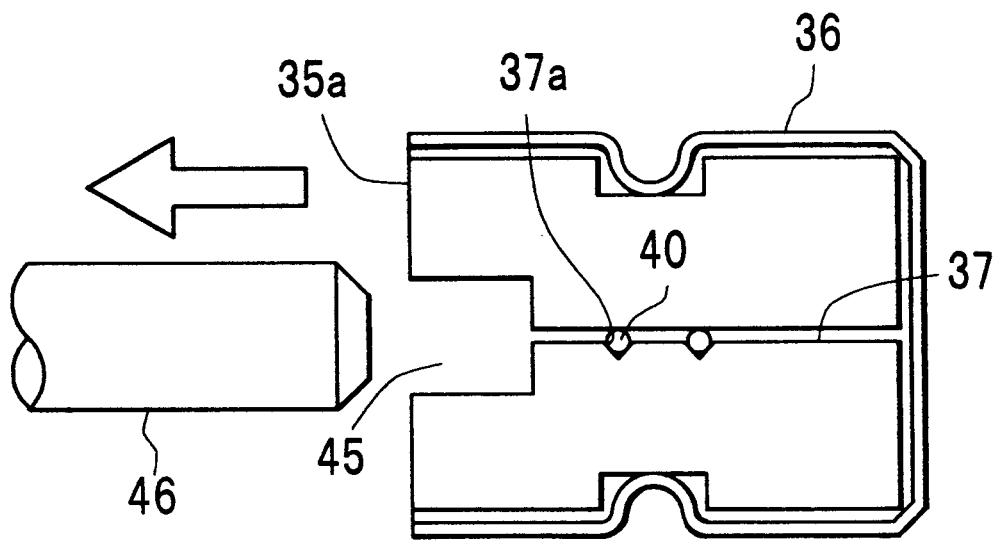

When inserting the tip of the optical fiber 28 into the connecting mechanism 22, as shown in FIG. 4(a), the devices 35, 35a and 35b are released, by inserting the releasing member 46 into the opening 45, so as to release the devices 35, 35a and 35b. Then after the abutting and connecting of the single-core fiber 40 and the optical fiber 31 on the side of the ferrule 21 have been completed, the releasing member 46 is pulled out of the opening 45, as shown in FIG. 4(b). The optical fiber 40 is then clamp held inside the connecting mechanism 22 by the clamping force of the spring 36. After the connection work, since there is no occurrence of the optical fiber 38 falling out of the connecting mechanism 22 due to the clamping force, work on storing the ferrule 21 and the connecting mechanism 22 in the housing 23 can be conducted efficiently. Moreover, for the connecting mechanism 22, simply by pulling out the releasing member 46 from the opening 45, a plurality of pairs of the optical fibers 31 and 40 which have been connected can be collectively and simultaneously clamp held, and the workability is greatly enhanced, in comparison to the case of fusion connection.

For this optical connector 20, since the aligning mechanism 37a which is composed of a positioning groove can arrange the connected optical fibers 31 and 40 with a density higher than that for the fusion-spliced part, the housing 23 and the like can be made small in size, in comparison to the case of storing the fusion-spliced part. Thereby an overall miniaturization is possible. Moreover, a large number of optical fibers 31 and 40 can be connected in a small space, and the increase in the number of cores capable of being handled is facilitated.

Further, the present invention is not limited to the embodiments, and for example, variations such as the adoption of a connecting mechanism of a round rod shape in external appearance, and connecting mechanisms provided with aligning mechanism other than the positioning grooves are possible.

As devices, it is not limited to the embodiments shown, and various constructions can be adopted. For example, a projecting part abutting the spring, on the one side or on the both sides of a base or a cover of a halved device, preferably projected and set at the central part, a construction which is made so as to accurately receive the impelling force of the spring by this projection can also be adopted. The projecting part extended and set on the base and cover of the device is not limited to a single part, but may be plurality in number, and various forms can be adopted as well.

Further, the number of pieces of the optical fibers which are internally fixed in the ferrule may be one strand or may be equal to three or more strands.

In this case, it is needless to say that the number of aligning mechanisms which set the connecting mechanisms may vary.

What is claimed is:

1. An optical connector comprising an optical connector ferrule provided with a polished front end, in which optical fibers are arranged and fixed in parallel, and a connecting mechanism for maintaining the connecting conditions between the optical fibers protruded from the rear end of the optical ferrule and the other optical fibers to be abutted and connected with the optical fibers by clamp holding these optical fibers internally, wherein said optical ferrule comprises a step at the rear end thereof, said connecting mechanism comprises halved devices provided with an aligning mechanism for aligning the optical fibers, and a spring of either C-shape or square sided C-shape clamp holding for clamp holding, allowing opening and closing between the halved devices by interposing the halved devices from the outside.

2. The optical connector according to claim 1, wherein between both of said devices said aligning mechanism is arranged in a plurality of arrays and arranges aligning axial line of each aligning mechanism in parallel on an identical array plane, and the array plane of the aligning axial lines substantially match the array plane of the optical fiber fixed in said optical connector.

3. The optical connector according to claim 2, wherein an extended part projecting from one side of the halved device is anchored by being inserted into a cutout formed in said optical connector ferrule, and the other side of the device is freely openable with respect-to said one side of the device.

4. The optical connector according to claim 3, wherein said aligning mechanism extends to said cutout.

5. The optical connector according to claim 1, wherein a spring which integrally clamp holds said devices is divided into plural number by a slit, and each of these divided parts respectively function as individual springs to separate a respective plurality of devices which open and close, with respect to oblong devices.

6. The optical connector according to claim 1, wherein said optical connector is provided with said optical connector ferrule, and said connecting mechanism a housed by cylindrical housing which houses freely reciprocatively, attached to a rear end side of the optical connector ferrule, and is further provided with an impelling means for impelling said optical connector ferrule and said connecting mechanism forward, and a movement regulating means having said optical connector ferrule abut so as to regulate forward movement.

7. The optical connector according to claim 6, wherein said impelling means is a ring-shape elastic body or a coil spring, and the optical fiber which is inserted into said connecting mechanism to penetrates the interior.

8. The optical connector according to claim 1, wherein said device is made of a transparent resin, and the optical fiber which penetrated to the interior is such that the optical fiber is observable from the outside of the connecting mechanism.

9. An optical connector comprising an optical connector ferrule provided with a polished front end and a rear end, in which optical fibers are arranged and fixed in parallel and a connecting mechanism for maintaining the connecting conditions between the optical fibers protruded from the rear end of the optical ferrule and the other optical fibers to be abutted and connected with the optical fibers by clamp holding these optical fibers internally, wherein a cutout is formed at the rear end of the optical fiber ferrule, said connecting mechanisms comprises halved devices provided with an aligning mechanism for aligning the optical fibers, the halved devices comprises a device provided with an extended part which is inserted into the cutout of the optical ferrule, and another halved device is freely openable with respect to the device, and a spring of either C-shape or square sided C-shape clamp holing for clamp holding, allowing opening and closing between the halved devices by interposing the halved devices from the outside.

* * * * *

UNITED STATES PATENT AND TRADEMARK OFFICE
CERTIFICATE OF CORRECTION

PATENT NO.    : 6,186,672 B1
DATED         : February 13, 2001
INVENTOR(S)   : Kazuhiro Takizawa et al.

It is certified that error appears in the above-identified patent and that said Letters Patent is hereby corrected as shown below:

<u>Title page,</u>
Item [73], Assignee, add -- Fujikura Ltd., Japan. --

Signed and Sealed this

Twenty-fourth Day of December, 2002

JAMES E. ROGAN
*Director of the United States Patent and Trademark Office*